W., F. A. & E. J. GESELL.
LUBRICATING DEVICE.
APPLICATION FILED APR. 3, 1912.
1,097,422.
Patented May 19, 1914.
2 SHEETS—SHEET 1.
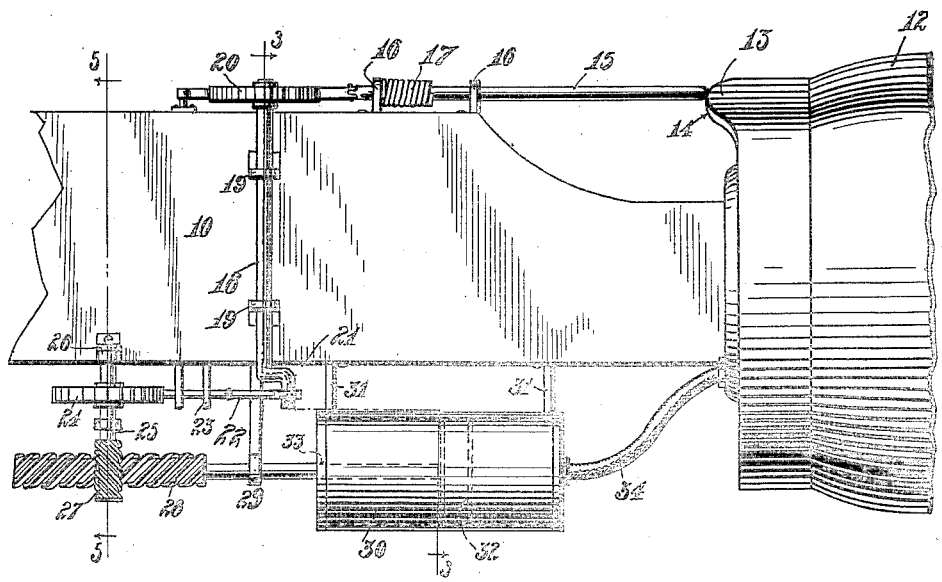
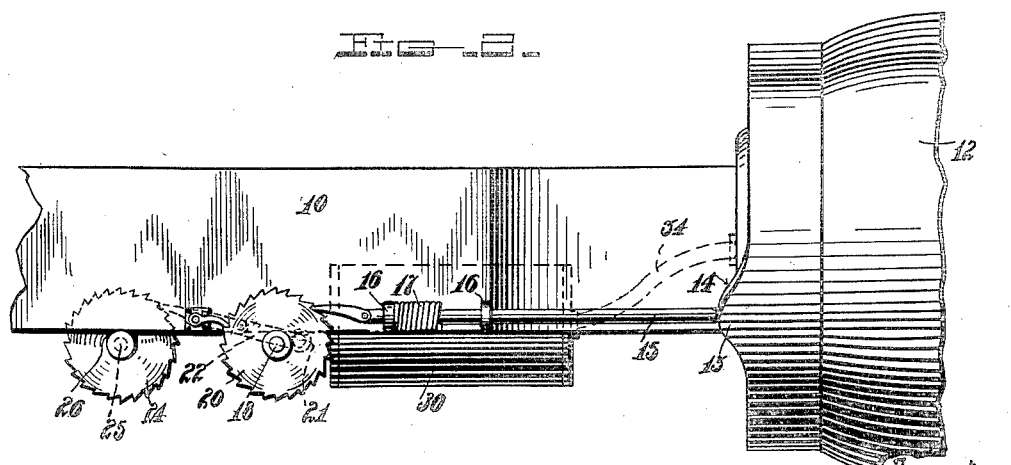
Witnesses
Inventors
W. Gesell,
F. A. Gesell,
and E. J. Gesell,
By
Attorneys

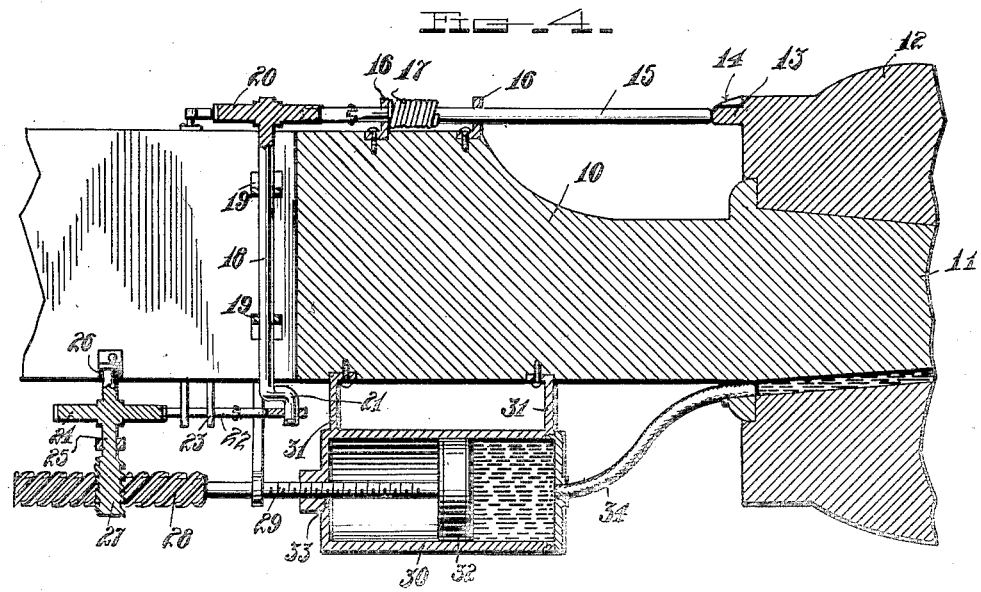
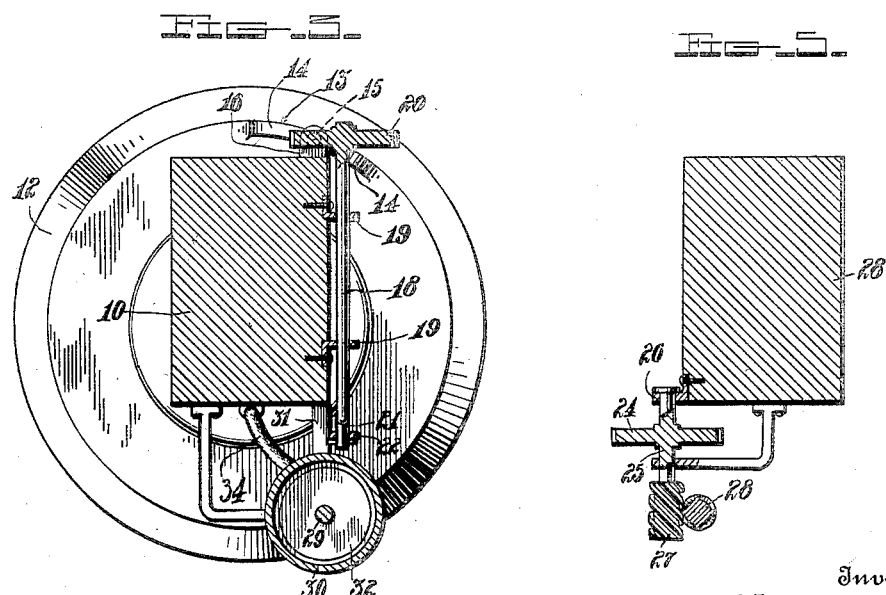

UNITED STATES PATENT OFFICE.

WILLIAM GESELL, FREDERICK A. GESELL, AND EZRA J. GESELL, OF SIDNEY, OHIO.

LUBRICATING DEVICE.

1,097,422.  Specification of Letters Patent. Patented May 19, 1914.

Application filed April 3, 1912. Serial No. 688,201.

*To all whom it may concern:*

Be it known that we, WILLIAM GESELL, FREDERICK A. GESELL, and EZRA J. GESELL, citizens of the United States, residing at Sidney, in the county of Shelby, State of Ohio, have invented certain new and useful Improvements in Lubricating Devices; and we do hereby declare the following to be a full, clear, and exact description of the invention, such as will enable others skilled in the art to which it appertains to make and use the same.

This invention relates to new and useful improvements in lubricating devices.

In the accompanying drawing this invention is shown as applied to a wagon axle and hub but it is to be understood that it may be used in connection with any device to which the various parts will adapt themselves.

The object of this invention is the provision of a lubricator which will be automatically operated to feed grease or the like to the hub of a wheel or its equivalent.

Another object of this invention is the provision of a device of this character which will be comparatively simple and inexpensive to manufacture, reliable and efficient in use and readily operated.

With the above and other objects in view this invention resides in the novel features of construction, formations, combinations and arrangements of parts to be hereinafter more fully described, claimed and illustrated in the accompanying drawings, in which:

Figure 1 is a side elevation of our invention applied to a wagon axle and hub of a wheel. Fig. 2 is a top plan view thereof. Fig. 3 is a transverse sectional view taken on the line 3—3 of Fig. 1. Fig. 4 is a longitudinal sectional view taken on the line 4—4 of Fig. 1. Fig. 5 is a second transverse sectional view taken on the line 5—5 of Fig. 1.

Referring to the accompanying drawings by similar characters of reference throughout the several views, the numeral 10 designates generally a wagon axle formed at one end with the usual spindle 11 on which is located the hub 12 of the wheel. A segmental extension 13 is formed upon the inner end of the hub 12 and is gradually tapered toward its opposite ends to produce a cam surface 14 for engagement with the adjacent end of an operating rod 15 slidably located in guides 16 attached to the said axle 10. This operating rod 15 is normally forced into yielding engagement with the cam extension 13 by means of a spring 17 which surrounds the said rod 15 being connected at one end to this rod and at its opposite end to the axle 10.

A shaft 18 is journaled in suitable guides 19 carried by the axle 10 and carries keyed to one end thereof a ratchet wheel 20 for engagement with a pawl 15' pivoted to the adjacent end of the rod 15 whereby upon the longitudinal movement of the rod, the said ratchet wheel will be rotated and also the shaft 18. The opposite end of the shaft 18 is formed with a crank extension 21 which is connected by means of a link 22 to a pawl 22' slidably secured to the axle 10 by brackets 23. The said pawl 22 engages the teeth of a ratchet wheel 24 which is keyed to a rotatable shaft 25 journaled in bearings 26 secured to the axle 10 as clearly illustrated in the figures of the drawings. The lower end of the shaft 25 is equipped with a worm wheel 27 which meshes with a worm 28 formed upon the adjacent end of a longitudinally movable shaft 29 which passes through the adjacent end of a grease cup 30, mounted in suitable brackets 31 which extend from the axle 10.

A plunger 32 is disposed for longitudinal movement within the grease cup 30 and is keyed to the adjacent end of the shaft 29, the worm of which also meshes with the threaded bearing 33 formed in the adjacent end of the said grease cup 30. A tube 34 extends from the opposite end of the grease cup 30 and communicates with the spindle 11 within the hub 12.

Obviously upon the rotation of the hub 11 upon the axle the cam extension 13 will operate the rod 15 which through the medium of the ratchet wheels 20 and 24 together with the shaft 18, crank arm 21 and pawl 22' will cause the rotation of the shaft 29 thus moving the plunger 32 longitudinally of the oil cup 30 and forcing the lubricating substance contained therein through the tube 34 into the hub 12 between the interior bore thereof and the spindle 11. It should be understood in this connection that various minor changes in the details of construction can be resorted to within the scope of the appended claim without departing from or sacrificing any of the advantages of the invention.

From the foregoing disclosures taken in connection with the accompanying drawings it will be manifest that a device of the nature described is provided which will fulfil all of the necessary requirements of such a device.

Having thus fully described this invention what we claim as new and desire to protect by Letters Patent is:—

A lubricating device comprising a support, a rod mounted for longitudinal reciprocation on said support, a shaft rotatably mounted on the support and having a crank arm on one end, a ratchet wheel fixed on said shaft, a pawl pivoted on said rod and coöperating with said ratchet wheel, means for reciprocating said rod to effect the intermittent rotation of said shaft, a second shaft rotatably mounted on said support, a ratchet wheel fixed on the second shaft, a pawl mounted for operative engagement with the last named ratchet wheel, connections between said pawl and the crank arm of the first named shaft whereby the rotation of the first named shaft will reciprocate the pawl to effect the intermittent rotation of the second named shaft, a grease cup carried by the support, a plunger operating in said grease cup and including a stem having a threaded connection with the grease cup whereby the rotation of said stem will feed the plunger longitudinally of the grease cup, a worm gear connecting between the second shaft and said stem for effecting the rotation of the latter, and a discharge for the grease cup.

In testimony whereof, we affix our signatures in presence of two witnesses.

WILLIAM GESELL.
FREDERICK A. GESELL.
EZRA J. GESELL.

Witnesses:
HARRY C. DYE,
WALTER M. EISENSTEIN.